2,865,712
PROCESS FOR RECOVERY OF GERMANIUM
SULFIDE

Leslie J. Bechaud, Jr., Grass Valley, Calif., and Plato Malozemoff, Flushing, N. Y., assignors to Tsumeb Corporation Limited, a corporation of South West Africa No Drawing. Application July 7, 1954
Serial No. 441,933
2 Claims. (Cl. 23—134)

This invention relates to the recovery of germanium sulfide from sulfide ores or concentrates (for convenience called sulfide concentrates) and has for its object hte provision of an improved process of recovering germanium sulfide from concentrates containing the sulfides of copper, lead, and germanium, with or without other sulfides that volatilize with germanium sulfide, such as arsenic sulfide.

This invention is based on our discovery that by mixing a relatively small amount of coal or equivalent solid carbonaceous material with the sulfide concentrate the germanium sulfide can be volatilized and recovered by sublimation at temperatures that would otherwise fuse the mixture of copper sulfide and lead sulfide and prevent the efficient recovery of the germanium sulfide.

Our invention provides a process for the treatment of a sulfide concentrate including sulfide minerals of copper and lead in preponderant amounts and a small amount of sulfide germanium mineral in a suitable finely divided or granular state in admixture and with a solid carbonaceous material consisting of coal, coke or wood sawdust, or heavy hydrocarbons such as coal tar or coal tar pitch which yield fixed carbon on thermal decomposition, in a suitable state of fineness and in an amount not less than about 4% based on the weight of the concentrate comprising heating the mixture to a temperature in the range of from 800° to 1150° C. which is above the fusion temperature of the copper and lead sulfides but without fusion of said sulfides, and passing a hot nonoxidizing gas in contact with said mixture, thereby volatilizing the germanium sulfide and removing it from the charge.

Sulfide concentrates of the type treated according to the invention are usually in the form of flotation concentrates and in a fine state of subdivision. They contain, say, from about 10% to about 40% of copper, from about 4% to about 50% of lead, usually some arsenic, say around 2% to 6%, and a small amount of germanium, usually less than 1%. A specific concentrate may contain, for example, about 30% copper, 28% lead, 6% arsenic, and 0.20% germanium, all as sulfides.

The concentrate and solid carbonaceous material are suitably mixed together in a fine state of subdivision and heated to a temperature preferably in the range of 850° C. to 1100° C. with a hot nonoxidizing gas passing in contact with said mixture. The volatilized sulfides are condensed forming a product containing practically all of the germanium sulfide, virtually all of the arsenic sulfide and a small amount of lead sulfide. It is to be understood that while the practice of this invention leads to the sublimation of volatile sulfides, the final product recovered may either be in sulfide form or may be the result of subsequent action in which case the volatile metals or metalliferous substances may be recovered in some other form, for instance as oxides. The germanium recovery is in the order of 95%. The invention is primarily for the removal of germanium sulfide from the sulfide concentrate to obtain a smaller bulk, higher grade material to facilitate further processing. The high recovery of germanium sulfide is due to the porous character of the charge coupled with the neutral or reducing gases passing in contact with the charge.

Any suitable coal, coke or carbon containing substance can be used, preferably coal containing 25% or more volatile matter. The analysis of the coal used does not appear to be critical. Equally good results have been obtained with a high volatile, low rank coal, and with coal containing better than 90% fixed carbon. Volatile matter derived from the carbonaceous additive during heating is not necessarily the agency promoting volatilization of germanium sulfide. The preferred method of operation, however, makes use of a high volatile coal, since this material in admixture with the sulfide concentrate permits slightly lower temperatures to be used.

The degree of fineness of the coal is not particularly critical. That is, with a 65 mesh flotation concentrate, 20 mesh coal is as satisfactory as coal pulverized to 100 mesh. However, best usage dictates that the coal be ground to some optimum particle size whereby it can be uniformly and intimately mixed with the ore or concentrate being treated. Generally the coal should be reduced to a size roughly similar to that of the ore or concentrate which may be pulverulent or granular. The function of the coal is apparently two-fold: (1) to provide a reducing condition within the charge in the furnace and in the ambient atmosphere, and (2) to prevent fusion of sulfide particles. Wood sawdust or similar finely divided organic matter may be used alone or as a supplement in admixture with coal or even with coke because it contributes to the porosity of the charge and provides fixed or elemental carbon together with a gas whose composition is substantially reducing.

When mixed sulfide minerals of copper and lead are heated under an atmosphere of reducing gases, they will fuse at some temperature around 850° C., the extent of fusion and exact temperature depending to some extent upon the relative amounts of copper and lead present. When fusion occurs, volatilization of germanium ceases, or at best is drastically reduced when operating within the desired temperature range. If, however, a small amount of coal, for example, about 8% by weight of the sulfide concentrate, is mixed with the charge, the fusion point of the mixture is raised so that fusion does not occur within the operating temperature limits. The charge remains open and porous and high recoveries of germanium sulfide are obtained. The carbon particles derived from the thermal decomposition of the carbonaceous substance in admixture with the particles of the sulfide concentrate act effectively as an isolator of fusible sulfide particles so that sulfide materials can be processed for germanium sulfide recovery in conventional furnace equipment.

In one application of our process, we roast a finely divided mixture of coal and sulfide concentrate in a conventional Herreshoff furnace, which may be either direct fired or muffle fired, under reducing conditions and, because of the coal, fusion on the hearth is prevented and the material in the furnace is maintained as a more or less free flowing granular mass. Without the coal, furnace treatment of this type is impossible because of fusion of sulfides of copper and lead resulting in a sticky mass which prevents rabbling. In the instance of a muffle fired furnace, it may be advantageous to introduce into the muffle chambers a quantity of a substantially nonoxidizing gas such that the velocity of the gas stream through the chambers is sufficient to sweep volatilized metal sulfides and metalliferous substances from the reaction zone.

In another application of our process, we roast a finely divided mixture of coal and sulfide concentrate under reducing conditions on a grate-type machine such as a Dwight-Lloyd or Greenawalt machine. In this type of operation, we prefer to pelletize the concentrate and coal with water, and binders if necessary, and to pass a layer of pellets about 6 inches deep under a firing hood operating with stoichiometric air supply. All of the heat required for roasting is supplied by the burners in the firing hood, which can be located either above the bed as in conventional downdraft operation, or below the bed as in updraft operation. Combustion gases and volatiles are sucked through the bed by a fan and the volatiles are subsequently condensed and collected or subjected to other subsequent reaction prior to recovery. There is nothing particularly critical about the pellet size other than that they should be of such conformation as to exhibit minimum static drop through the bed while permitting a reasonable heat transfer rate through the pellet. In general, pellets sized between about ½ inch and 1 inch are satisfactory for this type of operation.

In accordance with that aspect of our invention in which pellets are treated on a sintering grate, it is advantageous to incorporate some sawdust in the pellets. When pellets containing coal are heated to the temperature range 850° C.–1150° C., beads of fused matte may form in which case they work their way to the surface of individual pellets where they run together and form large masses of fused material in the interstices between pellets. Porosity of the bed is thus reduced and heat transfer from combustion gases is affected adversely. In the case of pellets, the coal is not as effective an isolator as when the charge is heated in a "loose" condition as in a hearth-type furnace. However, if wood sawdust in the amount of approximately 3% to 10% by weight of the charge is added to the material before pelletizing, better control over the tendency for fusion can be attained. Apparently, the voids created by the carbonizing of the sawdust has an effect on the fusible phase of the concentrate mixture. The use of sawdust or similar finely divided bulky organic material when treating a pelletized charge on a sintering grate or other device facilities transfer of hot combustion gases through the charge.

When treating a pelletized charge in a sintering machine, the physical character of the bed and roasted pellets can be controlled to any extent desired by the judicious proportioning of the additives coal and sawdust. When total non-fusion is desired, even to the extent of preventing incipient fusion of the particles of mineral matter forming the pellets, the quantity of coal additive can preferably be adjusted to within the approximate range 6% to 10%, or perhaps more in some instances, and the sawdust additive can be regulated within approximately 5% to 10%. The optimum amounts of the additives for any particular concentrate will depend upon the relative proportions of the various mineral constituents and the relative ease of fusion of the individual species comprising the mixture.

The amount of coal required to prevent fusion of copper-lead sulfides during volatilization of germanium is dependent to some extent upon (a) the operating temperature of the furnace, (b) the ratio of copper sulfide to lead sulfide, and (c) the method used for heating the ore to reaction temperature.

In the heating of a flotation concentrate containing approximately 30% Cu, 30% Pb, and 0.20% Ge (all as sulfides), in a muffle type furnace, the following data are illustrative of the effect of coal on the fusion of the charge:

| Furnace Temperature—° C. | Percent Coal | |
|---|---|---|
| 800 | 0 | Total fusion. |
| 800 | 2 | Partial fusion. |
| 800 | 4 | No fusion. |
| 900 | 4 | Partial fusion. |
| 900 | 6 | No fusion. |
| 950 | 6 | Partial fusion. |
| 950 | 8 | No fusion. |
| 1,000 | 10 | Do. |
| 1,100 | 10 | Do. |

Generally, we wish to operate within the range 800° C.–1150° C., the exact optimum temperature depending upon the time the charge is held within the furnace and the method of heating the charge coupled with the efficiency of removal of volatilized substances from the proximity of the charge. We have found that a fairly long contact time, say four hours, will result in a good recovery of germanium at about 850° C., but recovery is somewhat better at 950° C. with a shorter contact time of one hour. Also, when a method of furnace treatment is used such that the removal of volatilized substances is dependent in whole or in part upon processes of diffusion, higher temperatures, say 1100° C., are required in order to effect a substantial recovery of germanium. If, however, a hot non-oxidizing gas is passed through the interstices of the charge in the furnace such that volatilized substances are immediately and effectively removed from the proximity of the charge, equally good recoveries of germanium can be made at temperatures of 900–950° C.

We have found that with a concentrate containing about 40% copper and about 8% lead (as sulfides), fusion is prevented at 900° C. with about 4% of coal. With about 30% copper and about 30% lead, about 6% of coal is required to prevent fusion. When copper, lead, and sulfur are present in correct ratio to form the low melting point eutectic $Cu_2S$-PbS, coal additions might increase to 10% at 900° C.

In the preceding examples, the calorific value of the admixed coal is not used for heating purposes. However, in treating pellets comprising a mixture of sulfide concentrate and coal and preferably also containing sawdust in a sintering operation as in a Dwight-Lloyd machine or similar apparatus, the heating of the charge can be effected by first igniting the admixed coal and then blowing a regulated amount of air through the sinter bed to maintain combustion. The quantity of air so blown, however, must be regulated such that not all of the coal in the pellets is consumed, but a residual amount of coal is left to provide the proper atmosphere for volatilization of the germanium. In this case, part of the admixed coal is used for its calorific value and under such circumstances the quantity of coal required might be increased to from 20% to 40%. It is to be understood, however, that even when using excess coal for combustion purposes, a small amount of coal is left in the charge to control fusion of the sulfides of copper and lead.

During the heating operation, the volatiles from the coal are largely driven off. The material discharged from the furnace will contain in addition to the residual or non-volatile metal sulfides the fixed carbon portion of the coal, also the fixed carbon of the sawdust when used, ash, and a small amount of volatiles.

If the combustion gases are oxidizing; that is, if the heating fuel is burned with an excess of air, the oxygen will naturally react with part of the coal or products therefrom. If sufficient oxygen is present, the coal will all be consumed, and this is a condition to be avoided. Therefore, in the case of a heat exchange system in which heat is transferred from combustion gases to the charge, we prefer to control the combustion in such fashion that the combustion products are neutral, or substantially neutral. It appears that a small amount of free oxygen, in amount around 0.5% by volume, in the combustion gases has no deleterious effect upon volatilization of the germanium sulfide or the furnacing operation. The coal mixed with the sulfide concentrate in the amounts described is more than sufficient to offset any adverse oxidizing effect of small amounts of oxygen.

This application is a continuation-in-part of application Serial No. 403,076, filed January 8, 1954, and now abandoned.

We claim:

1. The process for recovering germanium sulfide from a sulfide-bearing material containing copper sulfide in an amount of not less than about 10% and lead sulfide in an amount of not less than about 4% and a small amount of germanium sulfide, which comprises intermixing with said sulfide-bearing material a solid carbonaceous material containing volatile hydrocarbons and which yields fixed carbon on thermal decomposition, heating the mixed charge to a temperature between about 800° C. and 1150° C. and above the normal fusion temperature of the copper and lead sulfides of said sulfide-bearing material, the amount of the carbonaceous material intermixed with the sulfide-bearing material being sufficient to yield, on decomposition, fixed carbon in an amount of not less than 4%, on the weight of the sulfide-bearing material, and sufficient to prevent fusion of copper and lead sulfides of said sulfide-bearing material when the sulfide-bearing material is heated to said temperature, said heating being carried out in an atmosphere of a non-oxidizing gas and effecting the volatilization of substantially all of the germanium content of the original sulfide-bearing material substantially free from the lead and copper sulfide contents thereof, and condensing the volatilized germanium content to recover the same.

2. The process for recovering germanium sulfide from a sulfide concentrate comprising from 10% to 40% of copper and from 4% to 50% of lead as sulfides, and a relatively small percentage of germanium sulfide which comprises intermixing said concentrate and a carbonaceous material of the group consisting of coal and wood sawdust all in a finely divided state, heating said mixture to a temperature between 850° C. and 1150° C. which is above the fusion temperature of the copper and lead sulfides, and maintaining hot non-oxidizing gas in contact with said mixture, the amount of the carbonaceous material intermixed with the sulfide-bearing material being sufficient to yield on decomposition, fixed carbon in an amount of not less than 4% based on the weight of the sulfide-bearing material, and sufficient to prevent fusion of the copper and lead sulfides of said sulfide-bearing material when the sulfide-bearing material is heated above said fusion temperature, said heating effecting volatilization of substantially all of the germanium content of the original sulfide-bearing material substantially free from the lead and copper sulfide contents thereof, and condensing the volatilized germanium content to recover the same.

References Cited in the file of this patent

UNITED STATES PATENTS

| | | |
|---|---|---|
| 2,719,081 | Allen et al. | Sept. 27, 1955 |
| 2,827,369 | De Merre | Mar. 18, 1958 |

FOREIGN PATENTS

| | | |
|---|---|---|
| 378,017 | Great Britain | July 22, 1932 |